United States Patent [19]

Ohmori et al.

[11] Patent Number: 4,804,976
[45] Date of Patent: Feb. 14, 1989

[54] SYSTEM FOR ENERGIZING THERMAL PRINTER HEATING ELEMENTS

[75] Inventors: Seishi Ohmori; Wayne F. Niskala, both of Tokyo; Yoshitaka Ishida, Kanagawa, all of Japan

[73] Assignee: Eastman Kodak Company, Rochester, N.Y.

[21] Appl. No.: 158,809

[22] Filed: Feb. 22, 1988

[51] Int. Cl.$^4$ .......................... G01D 15/10; B41J 3/20
[52] U.S. Cl. ................................. 346/76 PH; 400/120
[58] Field of Search .................... 346/76 PH; 400/120

[56] References Cited

U.S. PATENT DOCUMENTS

| | | | |
|---|---|---|---|
| 4,216,481 | 8/1980 | Hamoyama | 346/76 PH |
| 4,389,935 | 6/1983 | Arai | 101/93.01 X |
| 4,621,271 | 11/1986 | Brownstein | 346/76 PH |

Primary Examiner—Joseph W. Hartary
Assistant Examiner—Gerald E. Preston
Attorney, Agent, or Firm—Raymond L. Owens

[57] ABSTRACT

A thermal printer for printing an output dye image in a receiver including a memory circuit for storing a matrix printing pattern of pixels. The thermal printer comprises a detector for detecting the level of pixels data read out sequentially from the memory circuit to determine if a pixel of a line in the output image is to be printed has adjacent pixels that are not to be printed. Circuitry is provided to receive a printing pattern from the memory and to be responsive to the detector and to cause the heating elements corresponding to such image pixel to be printed to be energized above a predetermined dye transfer threshold level and the heating elements corresponding to pixels not be printed to be energized below the threshold level.

7 Claims, 4 Drawing Sheets

FIG.3(a)  FIG.3(b)
DATA LEVEL    TEM
 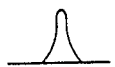
FIG.5
FIG.6(a)  FIG.6(b)
DATA LEVEL    TEM
 
FIG.6(c)  FIG.6(d)
DATA LEVEL    TEM
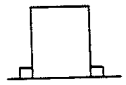 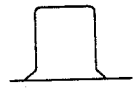

SYSTEM FOR ENERGIZING THERMAL PRINTER HEATING ELEMENTS

BACKGROUND OF THE INVENTION

1. Field of the Invention

This invention relates to dye transfer thermal printer receiver sheets, and more particularly to selectively energizing heating elements for improving image quality.

2. Description of the Prior Art

In a thermal printer shown in FIG. 1, a picture signal corresponding to an object viewed by a television camera 1 is fed to an analog/digital converting circuit 2. This analog/digital converting circuit 2. This analog/-digital circuit 2 digitizes the picture signal in synchronization with the scanning on the camera picture plane and feeds a digital signal having 8 bits corresponding to the dye density tone quality to a control circuit 3 being subject to program control. The control circuit 3 generates a matrix-like picture pattern having pixels (256×256, for example) in response to the digital signal input from the analog/digital circuit 2.

A key board 5 for generating character patterns and a character pattern generating circuit 6 (a character generating ROM) are also connected to the control circuit 3. When character information is input from the key board 5, the control circuit 3 generates a character code corresponding to the input character information. This character code is fed to the circuit 6 and causes the corresponding character pattern to be read from the character pattern generating circuit 6. Thus, the control circuit 3 serves to make a printing pattern or matrix of pixels which is a combination of characters and pictures and causes it (as shown in FIG. 2) to be stored in a memory circuit 7. The memory circuit 7 comprises a memory having a capacity of 512×512×8 bits, with the density or tone level of each pixel of the printing pattern corresponding to the 8 bits mentioned above. In other words, the density level can be selected from 256 different levels. The present invention makes use of the fact that a number of the lower levels (say the first 40) will not be sufficient to cause dye to transfer. This is described in detail in the Description of the Preferred Embodiments. The character pattern contained in the memory circuit 7 can be monitored through a monitor 8.

The control circuit 3 controls an address control circuit 10 so that a printing pattern contained in the memory circuit 7 is sequentially fed to a thermal print head (TPH) driving circuit 11 line by line. The driving circuit 11 converts the 8-bit dye density data for each pixel of the printing pattern to a pulse length or pulse number and selectively energized heating elements in a thermal print head 12 (TPH). The amount of heat generated causes the transfer of dye from a dye donor or film in direct correspondence to the amount of heat generated by each heating element. Each heating element corresponds to an image pixel in the receiver. For a more complete description of a thermal printer and circuitry for energizing heating elements, see U.S. Pat. No. 4,621,271 to Brownstein.

In a case where a printing pattern to be printed by the thermal printer contains narrow lines surrounding character or ruled lines for a table, it may happen that only one image pixel in a printed line correponds to the narrow line has a high density level (e.g. 255) as shown in FIG. 3(a) while adjacent image pixels are not printed. In such a case, a single heating element of the TPH 12 is energized and some of the heat produced will be absorbed by the adjacent heating elements as shown by the temperature (TEM) profile in FIG. 3(b). The temperature of the energized heating element corresponding to the single pixel to be printed is lowered due to heat transferred to adjacent heating elements as compared with the case of printing a plurality of contiguous pixels in a picture pattern. Consequently, in a case of printing narrow lines, the printing dye intensity of some pixels may be lower than desired.

SUMMARY OF THE INVENTION

The present invention was made to obviate the density drawback just described. Accordingly, it is an object of the invention to provide a thermal printer which prints characters, lines and the like to print image pixels with the appropriate dye density even if adjacent image pixels are not printed.

In order to achieve the object of the invention, in thermal printer there is provided a memory circuit for storing a digital image of in the form of a matrix having pixels corresponding to image pixels, a thermal head having a plurality of heating elements which can be selectively energized to produce different amount of heat above or below a predetermined dye transfer threshold level, and a driving circuit coupled to said memory circuit for driving said thermal head to sequentially print lines of image pixels at a time, the improvement comprising:

detector means coupled to said memory circuit for detecting the level of pixel data of a line read out sequentially from said memory circuit to determine if there are pixels that are not to be printed in a line in the output image adjacent to a pixel that is to be printed; and correction means coupled to said memory circuit and responsive to said detector means for causing said driving circuit to cause the heating elements corresponding to an image pixel to be printed to be energized above the threshold level and to cause heating elements corresponding to such adjacent image pixels not to be printed to be energized below the threshold level.

Other objects and aspects of the invention will become apparent from the following description of preferred embodiments with reference to the accompanying drawings.

BRIEF DESCRIPTION OF THE DRAWINGS

FIGS. 3(a) shows a data level for a heating element and 3(b) shows the temperature (TEM) profile of heat produced by such heating element;

FIG. 5 is a schematic view of an example of a series of image pixels;

FIGS. 6(a), 6(b), 6(c) and 6(d) explains data levels and temperature profiles of examples of printing conditions of the first embodiment of the invention;

DESCRIPTION OF THE PREFERRED EMBODIMENT

Figure 1:
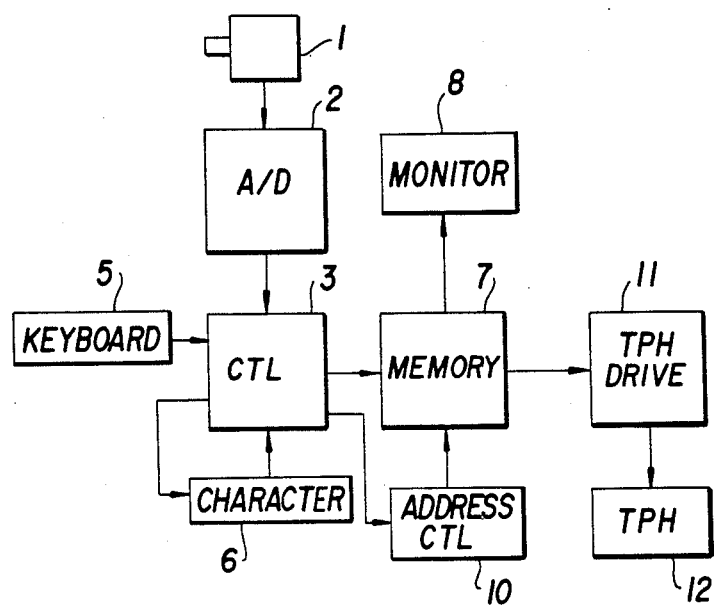
FIG. 1 shows a circuit arrangement of the prior art thermal printer.
Figure 4:
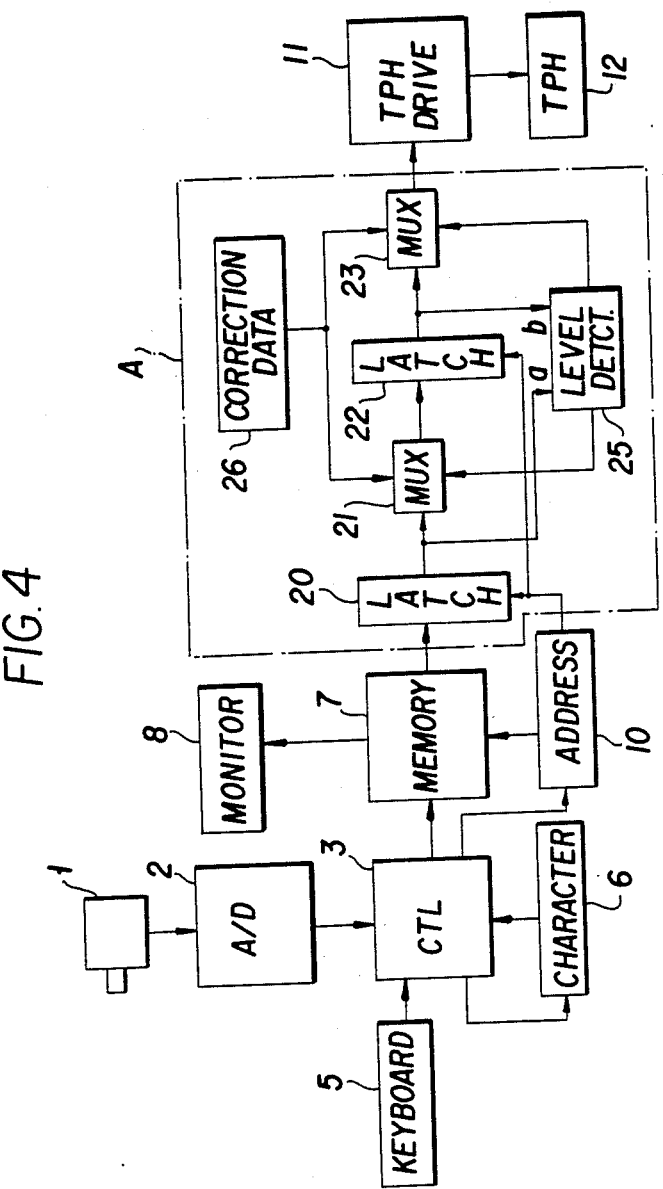
FIG. 4 shows circuit arrangement in accordance with a first embodiment of the invention.

The first circuit embodiment of the present invention will now be described by reference to FIGS. 4-6. FIG. 4 shows the main portion of a circuit arrangement of the first embodiment of the invention. In this figure, the same reference numerals as those in FIG. 1 designate like parts.

In FIG. 4, a block A includes a first latch circuit 20 for temporarily holding a plurality of bits of data corresponding to the density level of one image pixel of a printing pattern contained in the memory circuit 7. The output of the first latch 20 is connected to a second latch circuit 22. The output from the second latch 22 is, in turn, connected to a second multiplexer 23 and the output therefrom is connected to the driving circuit 11. Furthermore, the outputs of the first and second latch circuits 20 and 22 are also connected to a level detecting circuit 25, the outputs of which are connected to the first and second multiplexers 21 and 23, respectively. Also, the first and second multiplexers 21 and 23 receive the outputs from a correction data generating circuit 26. The remaining portions of the arrangement in FIG. 4 are similar to those of the conventional device described with reference to FIG. 1.

The operation of the first embodiment of the invention as described above will now be described. A printing pattern is stored in the memory circuit 7 by the operation already explained in connection with FIG. 1. More specifically, a picture signal from the television camera 1 corresponding to the object to be taken is digitized by the analog/digital converting circuit 2 in synchronization with the scanning of the camera. The digital signal thus generated represents a density or tone level of 8 bits (256 levels) and is converted by the control circuit 3 to a matrix-like picture pattern having, for example 256×256 pixels. When character information is input from the key board 5, the control circuit 3 generates a character code corresponding to the character information, and a character pattern corresponding to the character code is read out from the character pattern generating circuit 6. The character pattern is combined with the picture pattern to make a digital image printing pattern (see FIG. 2) to be stored in the memory circuit 7. The memory circuit 7 is a 512×512×8 bits memory, and the density level of each pixel of the printing pattern contained therein is represented by 8 bits as mentioned above.

The control circuit 3 controls the address control circuit 10 to have the memory circuit read out the density bits of each pixel in a line of the printing pattern in sequence from the memory circuit 7. The data for each image pixel of each line read out is latched in the first latch circuit 22. In the event that dye density pixel data for adjacent pixels are continuous as in the case of printing a picture pattern, the level detector 25 and the correction data generation circuit 26 do not operate, and an output image is printed by the known operation described with reference to FIG. 1.

Figure 2:
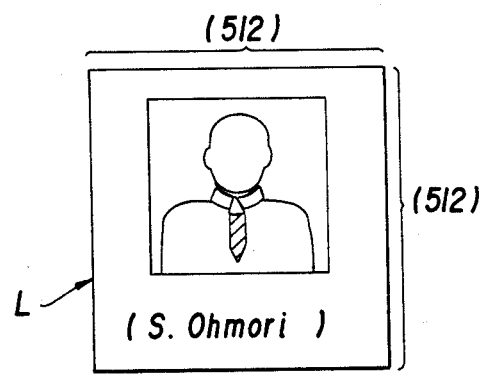
FIG. 2 schematically depicts a printing pattern contained in a memory circuit.

The unique operation of this invention is achieved when data for a narrow line as shown in FIG. 2 is read out. In general, a printed line in a line including characters and lines may often have discontinuous density or tone levels in a line, as schematically shown in FIG. 5.

In FIG. 5, the reference symbols $L_1$, $L_2$, $L_3$, $L_4$ ... $L_n$ designates image pixels in one line, wherein only the pixel $L_2$ is to be printed (e.g. density level of 255) while the adjacent pixels $L_1$ and $L_3$ and other pixels $L_4$ ... $L_n$ are not to be printed (density level of 0).

As mentioned above, the pixel density data are sequentially entered and held in the first and second latch circuits 20 and 22. When the pixel data $L_2$ is read out, the data is held in the first latch circuit 20, while the pixel data $L_1$ prior to the pixel data $L_2$ has already been held in the second latch circuit 22. In this condition, the contents of the latch circuits 20 and 22 are output to the level detector 25 which, in turn, detects the density level of the latched content $\alpha$ of the first latch circuit 20 and the latched content $\beta$ of the second latch circuit 22.

Since the latched content $\alpha$ has a higher level (255-level in this embodiment) and the latched content $\beta$ has a lower level (0-level in this embodiment), the level detector 25 controls the second multiplexer 23 so that, instead of the latched content $\beta$ of the second latch circuit 22, or the pixel data $L_1$, a correction energizing signal from the correction data generating circuit 26 is supplied to the driving circuit 11. Then the level detector 25 controls the first multiplexer 21 so that the latched content $\alpha$ of the first latch circuit 20, i.e., the pixel data $L_2$, is output and fed to the second latch circuit 22.

Since the latched content $\alpha$ has a higher level (255-level in this embodiment) and the latched content $\beta$ has a lower level (0-level in this embodiment), the level detector 25 controls the second multiplexer 23 so that, instead of the latched content $\beta$ of the second latch circuit 22, or the pixel data $L_1$, a correction energizing signal from the correction data generating circuit 26 is supplied to the driving circuit 11. When the level detector 25 controls the first latch circuit 20, i.e., the pixel data $L_2$, is output and fed to the second latch circuit 22.

The correction energizing signal has a level (e.g. tone level of 40-level) lower than a predetermined threshold level determined by the sensitivity of the dye carrier and the efficiency of the TPH 12, and even if the correction data is fed to the driving circuit 11, no dye transfer printing will be effected.

Then, the picture element data $L_3$ is read out from the memory circuit 7 and entered into the first latch circuit 20. Also in this case, the level detector 25 detects that the density level of the pixel data in the first and second latch circuits. Thus, the second multiplexer 23 is controlled so that the latched content $\beta$ of the second latch circuit 22, i.e., the pixel element data $L_2$, is supplied to the driving circuit 11 and the first multiplexer 21 is controlled so that, instead of the latched content of the first latch circuit 20, i.e., the pixel data $L_3$, the correction signal from the correction data generating circuit 26 is output and supplied to the second latch circuit 22.

Then, the pixel data $L_4$ is read out from the memory circuit 7 and inserted into the first latch circuit 20. In this case there is no substantial difference in the tone level between the latched contents of the first and second latch circuits 20 and 22, so the level detector 25 does not operate and the latched content of the second latch circuit 22, i.e., the correction signal, is supplied to the driving circuit 11, and the latched content of the first latch circuit 20 is supplied to the second latch circuit 22. A similar operation is repeated for all the pixels of each line to be printed.

As a result, the pixel data $L_1$, $L_2$ and $L_3$ of three adjacent pixels are corrected to the data levels shown in FIG. 6(a). Thus, as shown in the temperature profile of FIG. 6(b), when printing the pixel data $L_2$, the heating elements adjacent to the heating element corresponding to the data $L_2$ are also heated so that the temperature required for printing the pixel data $L_2$ is not lowered by the adjacent heating elements.

In addition to such a case as described above in connection with FIGS. 5 and 6, the present invention may also provide the same effect when printing the ends of a series of continuous or consecutive pixels having high tone level.

Figure 7:
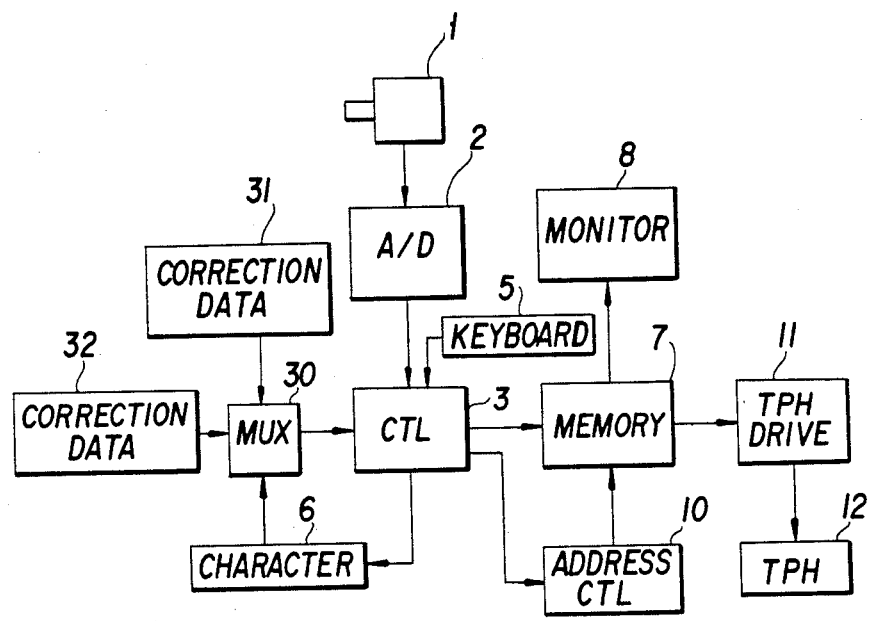
FIG. 7 shows another circuit arrangement in accordance with a second embodiment of the invention.

Referring now to FIG. 7, there is shown a circuit according to a second embodiment of the invention.

In FIG. 4, the second circuit embodiment features a multiplexer 30 connected between the character pattern generating circuit 6 and the control circuit 3, the first and second correction data generating circuits 31 and 32 connected to the multiplexer 30. Characters are printed by having image pixels either at maximum density or no density.

The first correction data generating circuit 31 supplies the first correction pixel density data of a level (e.g. density level of 40) lower that the dye transfer threshold level determined by the sensitivity of the printing film and the efficiency of TPH 12, no printing will be effected in a receiver sheet. TPH 12 will be understood to include digital/analog circuitry which provides the correct energizing signals to the heating elements. The second correction data generating circuit 32 supplies the second correction signal having the maximum density level of 255. The remaining portions are similar to those of the conventional device shown in FIG. 1, and the same reference numerals are used in FIG. 7 to designate components similar to those of FIG. 1.

In operation, the picture signal corresponding to the object sent from the television camera 1 is converted to a digital signal of 8 bits for representing density level for each image pixel by the analog/digital converting circuit 2. The control circuit 3 generates a matrix-like picture pattern having pixels (e.g. 256×256) in response to the digital signal input thereto.

Also connected to the control circuit 3 are the key board 5 for generating character patterns and a character pattern generating circuit 6 (including a character generating ROM). When character information is input from the key board 5, the control circuit 3 outputs and supplies a character code corresponding to the input character information to the character pattern generating circuit 6 which, in turn, supplies each pixel data ("0" or "1") of the character pattern sequentially in every line in correspondence to the character code.

When a pixel data from the character pattern generating circuit 6 is "0", the multiplexer 30 causes the first correction data (level 40), instead of the pixel density data "0", to be output from the first correction data generating circuit 31 to the control circuit 3. When the pixel data from the character pattern generating circuit 6 is "1", the multiplexer 30 causes the second correction data (level 255), instead of the pixel data "1" to be output from the second correction data generating circuit 32 to the control circuit 3.

Figure 8:
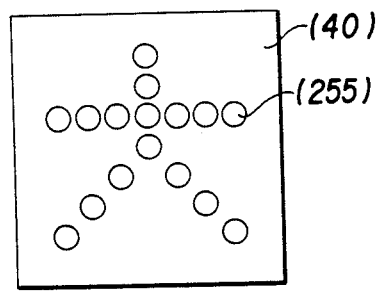
FIG. 8 is an example of a character pattern printed by the second circuit embodiment of the invention.

Consequently, when the character pattern as shown in FIG. 8 is output from the character pattern generating circuit 6, the pixel data "0" is replaced with the data of the tone level of 40, and the pixel data "1" is replaced with the data of the tone level of 255. The control circuit 3 makes a combination of this character pattern and the picture pattern and the composite printing pattern is stored in the memory circuit 7. The memory circuit 7 has a capacity of 512×512×8 bits, and the density of each image pixel of the printing pattern contained therein is represented by 8 bits. The character pattern contained in the memory circuit 7 is monitored by the monitor television 8.

The control circuit 3 controls the address control circuit 10 which causes each pixel of the printing pattern to be read out sequentially from the memory circuit 7 to feed digital density data to the driving circuit 11. The driving circuit 11 converts the density level data (8 bits) of the printing pattern to a suitable pulse length or pulse number for selectively energizing heating elements corresponding to the image pixels. Thus, the generation of heat and the amount of dye transferred for each image pixel are performed in response to the amount of heat generated by each heating element.

As described above, according to the present invention, narrow and high concentration print regions are detected and correction data having a density level which does not cause printing, is inserted into the regions adjacent the narrow and high concentration print regions. Therefore, the invention provides the remarkable effects whereby, even if a narrow and high concentration region is printed, it is possible to minimize the amount of heat from a heating element printing an image pixel to be lost to adjacent heating elements which are not printing image pixels. As a result, characters and narrow lines can be printed with a desired density concentration improving image quality.

The invention has been described in detail with particular reference to preferred embodiments thereof, but it will be understood that variations and modifications can be effected within the spirit and scope of the invention.

What is claimed is:

1. In a thermal printer for printing an output dye image in a receiver including a memory circuit for storing a digital image in the form of a matrix having pixels corresponding to image pixels, a thermal head having a plurality of heating elements which can be selectively energized to produce different amounts of heat above or below a predetermined dye transfer threshold level, and a driving circuit coupled to said memory circuit for driving said thermal head to sequentially print lines of image pixels at a time, the improvement comprising:
   detector means coupled to said memory circuit for detecting the level of pixel data of a line read out sequentially from said memory circuit to determine if there are pixels that are not to be printed in a line in the output image adjacent to one or more consecutive pixels to be printed; and
   correction means coupled to said memory circuit and responsive to said detector means for causing said driving circuit to cause the heating element corresponding to an image pixel to be printed to be energized above the threshold level and to cause heating elements corresponding to such adjacent image pixels not to be printed to be energized below the threshold level.

2. Thermal printer as claimed in claim 1 wherein said correction means comprises:
   correcting signal generating means for generating a correction signal when said detector means determines if there are pixels that are not to be printed in a line of the output image adjacent to one or more consecutive pixels that are to be printed; and multiplexer means responsive to said detector means for replacing the print data of such adjacent pixels not to be printed with the correction signal whereby the heating elements corresponding to the pixels not to be printed are energized below the threshold level.

3. Thermal printer as claimed in claim 2 wherein said multiplexer means comprises first latch means for holding print data of a first pixel in a line read out from said memory circuit and second latch means for holding print data of a second pixel positioned in the same line prior to the first pixel; and wherein said detector means receives the print data of the first and second pixels to determine if one pixel in the line is to be printed.

4. Thermal printer as claimed in claim 3 wherein the printing pattern comprises a picture pattern and a character pattern, and further including input means comprises means for generating a picture pattern, means for generating a character pattern, and control means for combining the picture pattern and the character pattern to make a printing pattern to be stored in said memory circuit.

5. In a thermal printer for printing an output dye image in a receiver including a memory circuit for storing a printing pattern of graphics in the form of a matrix having pixels corresponding to image pixels, input means for inputting a printing pattern to said memory circuit, a thermal head having a plurality of heating elements which can be selectively energized to produce different amounts of heat above or below a predetermined dye transfer threshold level, and a driving circuit for driving said thermal head on the basis of a printing pattern read out from said memory circuit, the improvement comprising:

signal generating means for generating energizing signals;

multiplexer means coupled to said input means and said signal generating means for causing each print data of image pixels not to be printed and are adjacent to an image pixel that is to be printed with a first correction energizing signal so that heating elements of said thermal head corresponding to such adjacent pixels not to be printed are energized below the threshold level.

6. Thermal printer as claimed in claim 5 wherein said signal generating means comprises:

first signal generating means for generating the first correction energizing signal which causes heating elements of said thermal head corresponding to such adjacent pixels not to be printed to be energized below the threshold level so as not to effect printing; and second signal generating means for generating a second correction energizing signal which causes heating elements of said thermal head corresponding to pixels to be printed to be energized above the threshold level so as to effect printing.

7. Thermal printer as claimed in claim 5 wherein said input means comprises:

means for generating a picture pattern;

means for generating a character pattern; and control means coupled to such means for combining the picture pattern and the character pattern to make a printing pattern and feed the printing pattern to said memory circuit.

* * * * *